United States Patent [19]

Townsend

[11] 4,034,779
[45] July 12, 1977

[54] REVERSIBLE SELF-PROPELLED CENTER PIVOT SPRINKLER SYSTEM

[76] Inventor: Loren R. Townsend, Sidney, Nebr. 69162

[21] Appl. No.: 681,079

[22] Filed: Apr. 28, 1976

Related U.S. Application Data

[63] Continuation-in-part of Ser. No. 664,184, March 5, 1976, Pat. No. 4,005,731.

[51] Int. Cl.² .......................................... B05B 3/12
[52] U.S. Cl. ............................... 137/344; 239/177
[58] Field of Search ............ 137/344; 239/177, 212

[56] References Cited

U.S. PATENT DOCUMENTS

| | | | |
|---|---|---|---|
| 3,606,161 | 9/1971 | Paul | 239/177 |
| 3,766,937 | 10/1973 | Lundvall et al. | 137/344 |
| 3,866,836 | 2/1975 | Dowd | 137/344 X |

Primary Examiner—Alan Cohan
Assistant Examiner—Gerald A. Michalsky
Attorney, Agent, or Firm—Zarley, McKee, Thomte, Voorhees & Sease

[57] ABSTRACT

A reversible self-propelled center pivot sprinkler system comprising a central pivot having an overhead water supply pipe extending outwardly therefrom supported by a plurality of drive towers. A drive and control apparatus is provided on each of the towers to propel the towers and water supply pipe around the central pivot point in an aligned condition. The drive apparatus is connected to a trojan bar which is reciprocatably mounted on the tower and which is provided with an automatically controlled movable double dog on at least one end thereof for engagement with drive lugs on at least one of the drive wheels of the tower. The double dog is normally in position so that movement of the trojan bar in one direction will cause the dog to engage the wheel drive lugs so that the tower will be moved in a forwardly direction. The double dog is automatically moved to a second position so that the dog will engage the wheel drive lugs as the trojan bar is moving in a second direction to cause the tower to be moved rearwardly. The double dog comprises a hydraulic cylinder operatively connected to a reversible trojan bar dog having opposing dog surfaces. A double ratchet-type brake is provided on the tower to prevent the tower from undesirable rolling in a direction opposite to the direction of driving travel. The double ratchet-type brake may be operatively interconnected to the double dog whereby remote control or operation of the double dog also causes the double ratchet-type brake to be moved to permit the tower to roll in the desired direction while preventing undesirable rolling in the opposite direction.

2 Claims, 21 Drawing Figures

REVERSIBLE SELF-PROPELLED CENTER PIVOT SPRINKLER SYSTEM

BACKGROUND OF THE INVENTION

This application is a continuation-in-part application of Ser. No. 664,184, filed Mar. 5, 1976, now U.S. Pat. No. 4,005,731.

This invention relates to a center pivot sprinkler system and more particularly to a reversible center pivot sprinkler system.

It has been found to be economically feasible to irrigate large areas of land through the use of a long water pipe extending from a central pivot point which is supported by a plurality of driven towers which are spaced along the length thereof. Alignment means has been provided on systems of this type to maintain the towers and supply pipe in an aligned condition as the pipe and towers are moved around the center pivot system. One such type of sprinkler system is disclosed in U.S. Pat. No. 3,916,942 which issued on Nov. 4, 1975. The device of the patent was designed to drive the towers around the center pivot in a forwardly direction. The device of the patent is quite successful but it has been found necessary in some cases to provide a means for reversing the direction of travel of the system. In some installations, it is impossible for the system to make continuous 360° revolutions around the center pivot due to terrain, trees, buildings, etc. Heretofore, it was necessary to run the system to the obstruction and then it was necessary to pull the system back to its starting point. Usually, the center pivot irrigation systems were not installed in those areas which had obstructions which resulted in considerable land not being irrigated.

Therefore, it is a principal object of the invention to provide an improved center pivot sprinkler system.

A still further object of the invention is to provide a reversible center pivot sprinkler system.

A still further object of the invention is to provide means for reversing the drive on the center pivot sprinkler system which is automatically controlled.

A still further object of the invention is to provide a reversible trojan bar dog for a center pivot irrigation system.

A still further object of the invention is to provide a center pivot sprinkler system which is economical of manufacture, durable in use and refined in appearance.

These and other objects will be apparent to those skilled in the art.

2

DESCRIPTION OF THE PREFERRED EMBODIMENT

The sprinkler apparatus of this invention is generally designated by the reference numeral 10 and includes a water supply pipe 12 extending outwardly from a center or central pivot 14 which is in communication with a source of water under pressure. The pipe 12 is comprises of a plurality of tubular sections 12a suitably connected together in an end-to-end relationship and which are supported by a plurality of drive towers 16.

Each of the towers 16 generally comprises a horizontally disposed frame member 18 having drive wheels 20 and 22 rotatably mounted at the opposite ends thereof as illustrated in the drawings. Wheels 20 and 22 are provided with a plurality of drive lugs 24 and 26 mounted on the periphery thereof respectively which extend laterally outwardly therefrom.

Frame members 28 and 30 are secured at their lower ends to opposite sides of frame member 18 and extend upwardly therefrom in a diverging relationship. Likewise, frame members 32 and 34 are secured to opposite sides of frame member 18 and extend upwardly therefrom in a diverging relationship. Frame members 36 and 38 are secured to opposite sides of frame member 18 and extend upwardly therefrom and have their upper ends secured to frame members 28 and 30 respectively by any convenient means such as bolts or the like. Brace 40 is secured to and extends between frame members 36 and 38 adjacent the upper ends thereof for pivotally supporting a plate 42 as will be described in more detail hereinafter.

A tubular member 44 is secured to the upper ends of frame members 28, 30, 32 and 34 and extends therebetween as illustrated in the drawings. One end of the tubular member 44 has one end of a pipe member 12a bolted thereto by conventional methods. One end of the universal-joint coupling 46 is secured to the other end of a tubular member 44 and is secured to one end of the pipe member 12a. As seen in the drawings, universal-joint 46 comprises members 48 and 50 having a sealing coupling 52 extending therebetween which permits movement between the members 48 and 50. Support arms 54 and 56 are secured to member 48 and extend therefrom while support arms 58 and 60 (not shown) are secured to the member 50 and extend therefrom. Gimble ring 62 extends around the coupling 52 in a spaced-apart relationship and has the ends of the arms 54, 56, 58 and 60 pivotally secured thereto. Thus, the universal-joint 46 permits pivotal movement about horizontal and vertical axes between the members 48 and 50. The numeral 64 refers to an alignment arm which is secured to the gimble ring 62 which extends horizontally outwardly therefrom. The numeral 66 refers to an alignment rod which is secured to the outer end of alignment arm 64.

Figures 5, 6, 7:
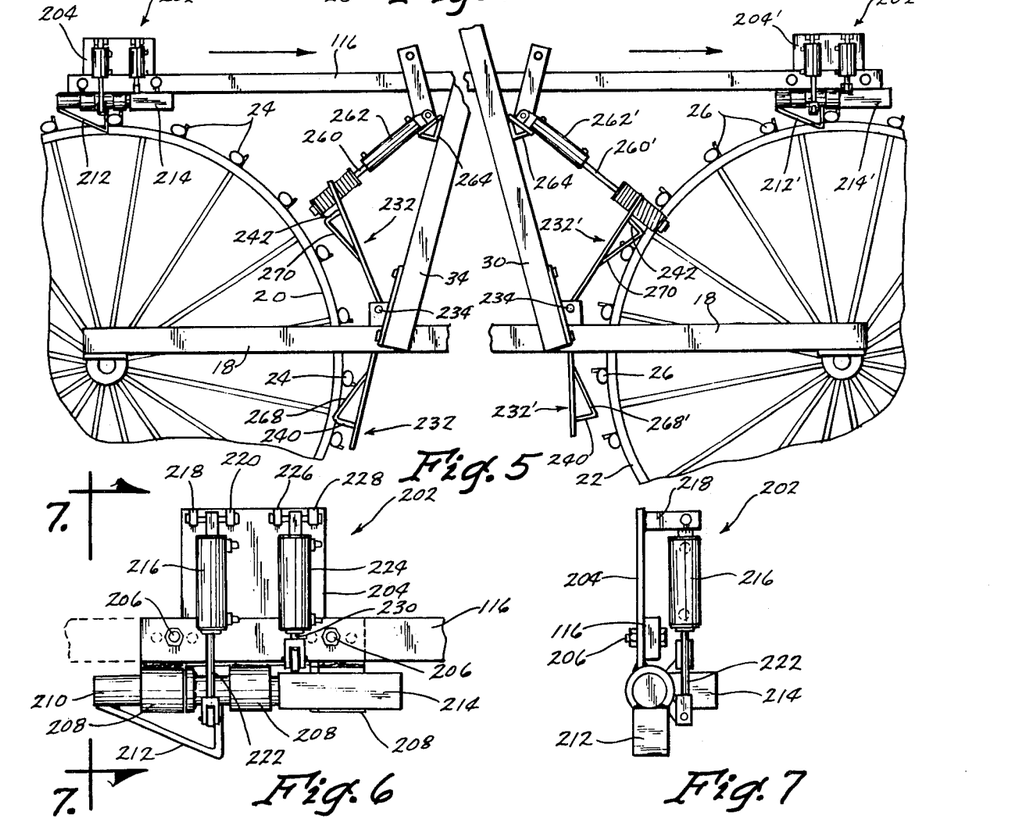
FIG. 5 is a view similar to FIG. 4 except that the drive means is illustrated in the reverse driving mode.
FIG. 6 is a side view of the double dog at one end of the trojan bar.
FIG. 7 is a view seen on lines 7—7 of FIG. 6.
Figure 14:
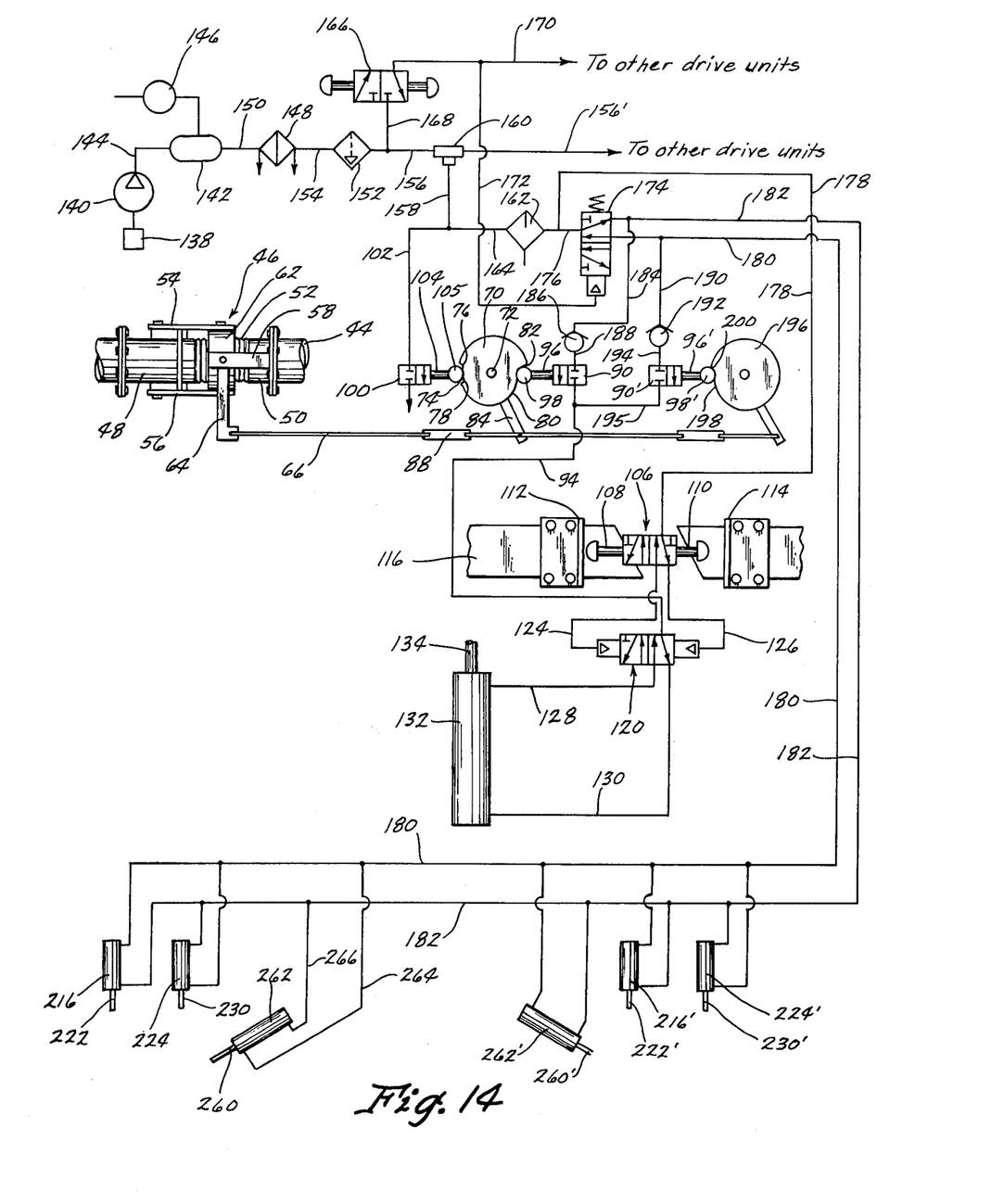
FIG. 14 is a schematic view of the circuitry of this invention.

The numeral 68 refers to an alignment panel (not shown) mounted on the tower and having an alignment cam 70 rotatably mounted thereon about a horizontal axis referred to generally by the reference numeral 72. As seen in the drawings, alignment cam 70 is provided with a notch 74 formed in its periphery to define shoulders 76 and 78. Cam 70 is also provided with a cam surface 80 formed in the periphery thereof having shoulder 82 at one end thereof. Arm 84 is secured to cam 70 by welding or the like and extends therefrom. A spring is connected to the arm 84 to urge the cam 70 in a counter-clockwise direction as viewed in FIG. 14 and to resist the clockwise movement of the cam 70 as illustrated in FIG. 14. Turnbuckle 88 connects the arm 84 and the alignment rod 66. Alignment valve 90 is mounted on the alignment panel 68 and has air inlet and outlet lines 92 and 94 operatively connected thereto as illustrated in FIG. 6. Alignment valve 90 has a plunger 96 having a roller 98 mounted thereon which is adapted to be engaged by the shoulder 82 on the alignment cam 70 upon sufficient clockwise rotation of the alignment cam 70 so that the alignment valve 90 is opened to permit air to be supplied to line 94.

The numeral 100 refers to a safety valve mounted on alignment panel 68 having an air inlet line 102 in communication therewith. Safety valve 100 is normally closed and has a plunger 104 extending therefrom which has a roller 105 mounted thereon adapted to engage the shoulders 76 or 78 upon predetermined rotation of the alignment cam 70 to a predetermined positon. As previously stated, safety valve 100 is normally closed but is exhausted to the atmosphere upon being opened as will be described in more detail hereinafter.

Figure 1:
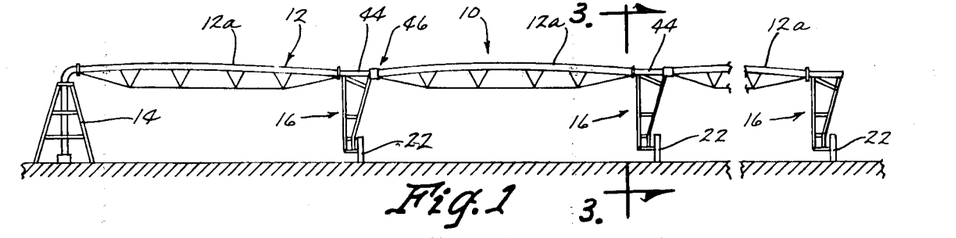
FIG. 1 is a partial side view of the center pivot sprinkler system.
Figure 2:
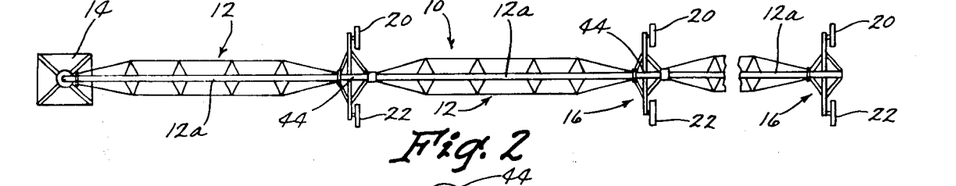
FIG. 2 is a partial top view of the system.
Figure 3:
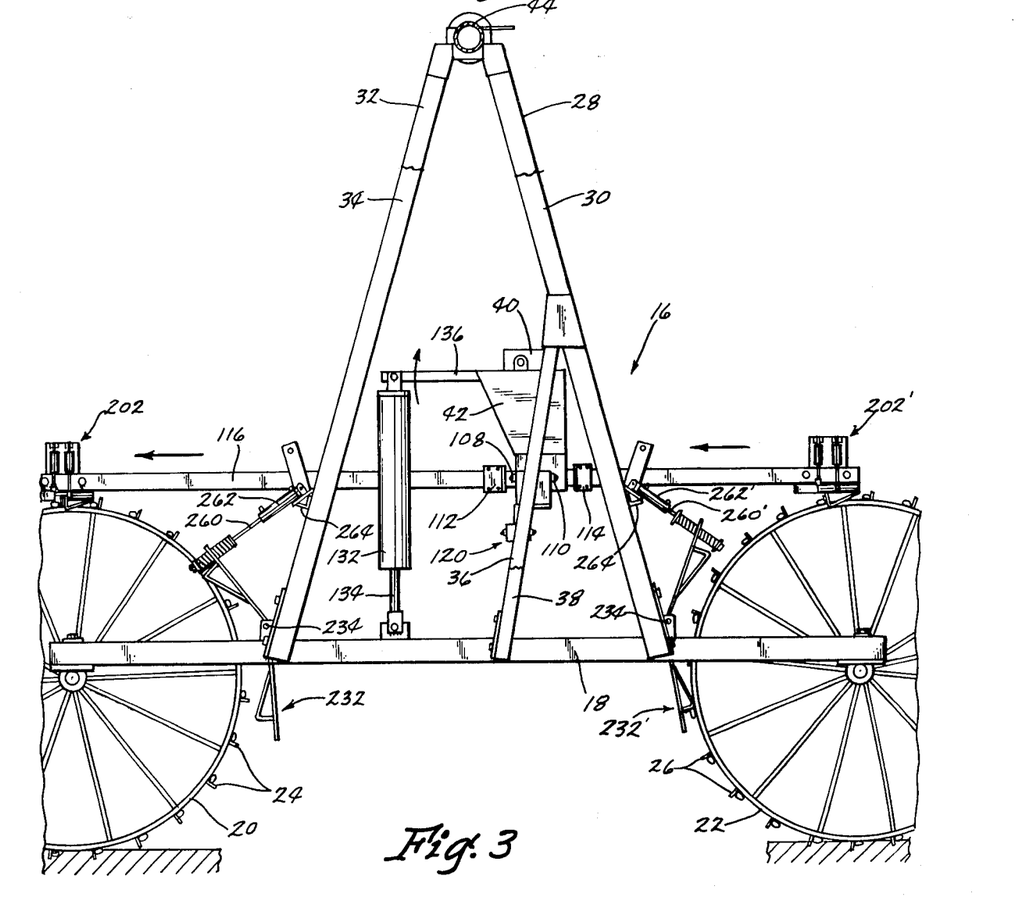
FIG. 3 is a partial side view of one of the drive towers having portions thereof cut away to more fully illustrate the invention.
Figure 4:
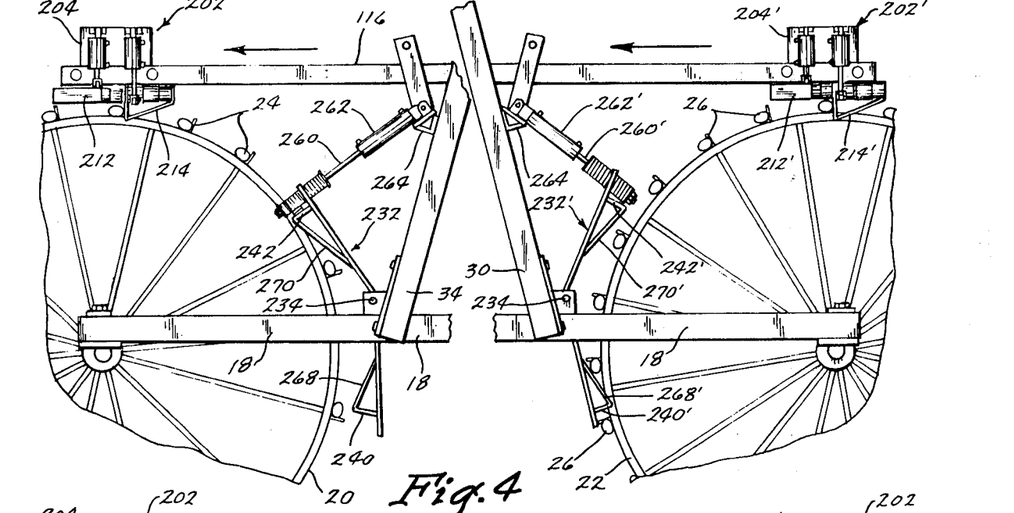
FIG. 4 is a partial fragmentary side view of the drive tower illustrating the drive means in a forward driving mode.

The numeral 106 refers to a four-way valve having plungers 108 and 110 extending from opposite ends thereof. Plungers 108 and 110 are adapted to be engaged by brackets 112 and 114 which are mounted on trojan bar 116 in a spaced-apart relationship. The numeral 120 refers to a pilot operated valve which is connected to line 94 extending from valve 90. Valve 120 is connected to the valve 106 by air lines 124 and 126 in the manner illustrated in the schematic of FIG. 14. Valve 120 has air lines 128 and 130 extending therefrom which are in communication with the opposite ends of a double acting air cylinder 132 having a rod 134 extending therefrom. While cylinder 132 is described as being of the air type, it should be understood that the cylinder could be powered by water, hydraulic fluid, etc. The lower end of rod 134 is pivotally connected to frame member 18 as seen in FIG. 3. The base end of the cylinder 132 is pivotally connected to one end of an arm 136 extending from plate 42. Trojan bar 116 is pivotally connected intermediate its length to the lower end of plate 42 and extends horizontally outwardly therefrom towards the drive wheels 20 and 22 respectively.

In FIG. 14, the power unit 138 may either be an electric motor or a gasoline engine so as to supply power to an air compressor referred to generally by the reference numeral 140. Air compressor 140 is conventionally connected to a surge tank 142 by line 144. A conventional high-low pressure switch 146 is connected to the surge tank 142 and is designed to de-activate the system if abnormally high or low air pressures are experienced within the surge tank 142. Surge tank 142 is connected to a cooling coil or apparatus 148 by line 150. Cooling apparatus 148 is connected to a conventional filter 152 by line 154. Filter 152 is provided with an air line 156 extending therefrom which extends to the drive units on all of the drive towers. As illustrated in FIG. 14, line 158 is connected to the line 156 and 160. Lubricator 162 is connected to line 158 by line 164.

A three-way valve 166 is positioned at the center pivot and is actuated by forward and reverse stops provided on the center pivot in conventional fashion. Valve 166 is connected to line 156 by line 168. Valve 166 has a line 170 extending therefrom which is connected to the drive units on the other drive towers. Line 172 extends from line 170 to a pilot operated spring loaded four-way valve 174. Valve 174 is connected to lubricator 162 by line 176. Line 178 extends from line 176 to valve 106. Lines 180 and 182 are also connected to the valve 174 as illustrated in the drawings. Line 184 extends from line 182 to a check valve 186 which is connected to valve 90 by line 188. Line 190 extends from line 180 to a check valve 192 which is connected to valve 90' by line 194. Line 195 extends from valve 90' to line 94. The numeral 196 refers to an alignment cam pivotally mounted on the alignment panel and which is provided with a cam surface 198 formed in the periphery thereof having a shoulder 200 at one end thereof. Plunger 96' extends from valve 90' and has a roller 98' mounted thereon which is adapted to be engaged by the shoulder 200 on the alignment cam 196 so that the drive units are maintained in the proper alignment when the drive towers are being operated in the reverse direction or mode. Cam 196 is operatively connected to arm 84 as seen in FIG. 14.

The numerals 202 and 202' refer to double trojan bar lug assemblies which are mounted on the opposite ends of trojan bar 116. Inasmuch as assemblies 202 and 202' are identical, only assembly 202 will be described in detail with "'" indicating identical structure on assembly 202'.

Support 204 is secured to the end of trojan bar 116 by bolts 206 or the like and has a plurality of spaced collars 208 welded to the lower end thereof which rotatably receive a shaft 210 extending therethrough. Shaft 210 has a dog 212 secured thereto by welding or the like at one end thereof. Shaft 210 also has a dog 214 secured thereto by welding or the like at the other end thereof. Dogs 212 and 214 are disposed 90° apart relative to shaft 210 as seen in the drawings. Air cylinder 216 is pivotally connected at one end thereof to arms 218 and 220 which extend outwardly from the upper end of support 204. The rod 222 of cylinder 216 is pivotally connected to shaft 210 so that extension of rod 222 causes shaft 210 to be rotated in collars 208 so that dog 212 is moved to the operative position.

Air cylinder 224 is pivotally connected at one end thereof to arms 226 and 228 which extend outwardly from the upper end of support 204. The rod 230 of cylinder 224 is pivotally connected to dog 214 so that extension of rod 230 causes dog 214 to rotate relative to shaft 210 so that dog 214 is moved to the operative position. Cylinders 216 and 224 are of the double acting type and are connected to the air lines 180 and 182 as illustrated in the schematic. Lines 180 and 182 are connected to the upper and lower ends of air cylinder 216 respectively. Lines 180 and 182 are connected to the lower and upper ends of cylinder 224 as also illustrated in the schematic. In other words, the supply of air through line 180 causes the extension of rod 222 and causes the retraction of rod 230. Conversely, the supply of air to the cylinders through line 182 causes the retraction of rod 222 and the extension of rod 230.

The numeral 232 refers generally to a reversible ratchet-type brake or arm which is pivotally connected to frame 18 adjacent wheel 20. Ratchet arm 232 is provided with a shaft 234 which is provided thereon and which extends laterally therefrom for pivotal connection to the frame 18 in any convenient means. As seen in the drawings, ratchet arm 232 generally comprises ratchet arm sections 236 and 238 which extend from shaft 234 at an angle with respect to each other. Section 236 is provided with a ratchet 240 while section 238 is provided with a ratchet 242. Ratchets 240 and 242 are designed to be moved into engagement with the lugs 24 on wheel 20 to prevent the rotation of wheel 20 in opposite directions as will be described in more detail hereinafter. Bracket 244 is secured to and extends laterally from the outer end of section 238 and is provided with an opening 246 which receives the shaft 248 extending therethrough. Springs 250 and 252 embrace shaft 248 on opposite sides of bracket 244 as seen in the drawings. Washer 254 and nut 256 are mounted on one end of shaft 248 at one end of spring 250. Washer 258 is welded to shaft 248 at the end of spring 252 as also seen in the drawings. Shaft 248 is operatively connected to the rod 260 extending from air cylinder 262. Air cylinder 262 is pivotally connected at its upper end to brace 264 which is secured to the frame members 32 and 34. Cylinder 262 is of the double acting type and is connected to lines 180 and 182 by lines 264 and 266 respectively as seen in the schematic of FIG. 14. Thus, the supply of air to the cylinder 262 by line 180 causes rod 260 to be retracted within cylinder 262 while the supply of air to the cylinder 262 through line 182 causes the extension of rod 260. Extension of rod 260 causes shaft 248 to be moved towards wheel 20 so that ratchet 242 is moved into engagement with lugs 24. Retraction of rod 260 causes shaft 248 to be moved towards the cylinder which causes arm 232 to pivot about 234 so that ratchet 242 is moved away from wheel 20 and so that ratchet 240 is moved towards wheel 20. Springs 250 and 252 permit arm 232 to move relative to the shaft 248 as the lugs 24 are passing over the inclined surfaces 268 and 270 of ratchets 240 and 242 respectively. A ratchet arm 232' is operatively pivotally secured to the upper end of frame member 18 and is controlled by the operation of cylinder 262'. The upper and lower ends of cylinder 262' are connected to the lines 180 and 182 as illustrated in the schematic. It can be seen that the supply of air through line 180 causes retraction of rod 260 into cylinder 262 and causes the extension of rod 260' from cylinder 262'. The supply of air through line 182 causes the extension of rod 260 from cylinder 262 and causes the retraction of rod 260' into cylinder 262'.

Figures 8, 9, 10, 11, 12, 13:
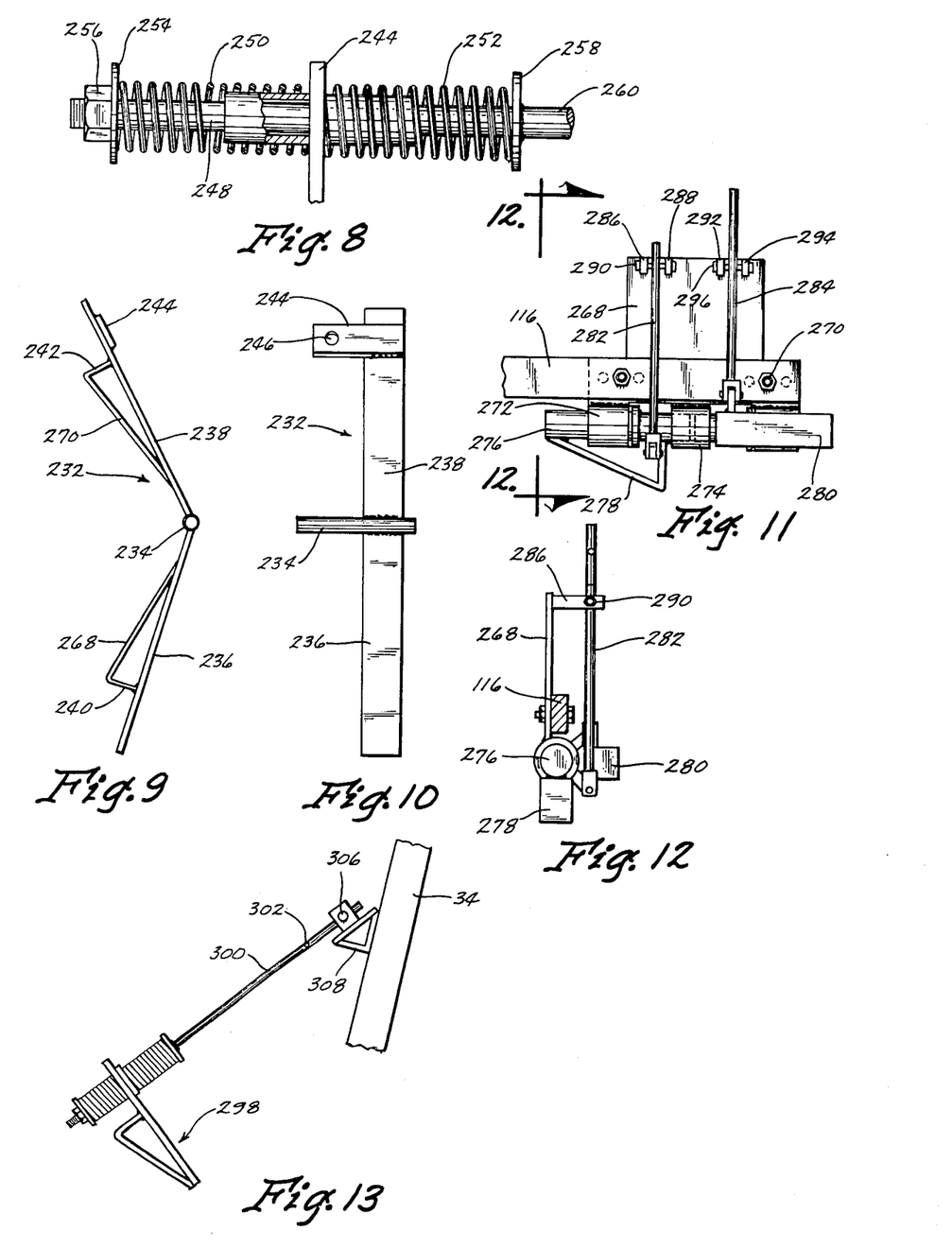
FIG. 8 is a partial side view of the spring means associated with the ratchet-type brake.
FIG. 9 is a side view of the double ratchet-type brake.
FIG. 10 is a plan view of the brake of FIG. 9.
FIG. 11 is a side view of a modified form of a double dog.
FIG. 12 is a sectional view seen on lines 12—12 of FIG. 11.
FIG. 13 is a side view of a modified form of the means for controlling the double ratchet-type brake.

A modified form of the double trojan bar lug assemblies is illustrated in FIGS. 11 and 12 and are of manual type as opposed to the cylinder controlled type illustrated in FIGS. 6 and 7. Support 268 is secured to trojan bar 116 by bolts 270 and extends upwardly therefrom. Collars 272 and 274 are welded to the lower end of support 268 and receive shaft 276 extending therethrough. Dog 278 is secured to one end of shaft 276. Dog 280 is rotatably mounted on shaft 276 and is disposed at a 90° angle relative to dog 278. Rod 282 is pivotally connected to dog 278 and extends upwardly therefrom while rod 284 is pivotally connected to dog 280 and extends upwardly therefrom. Spaced-apart brackets 286 and 288 are secured to the upper end of support 268 and extend outwardly therefrom and are adapted to receive a bolt 290 extending therethrough and therebetween. Rod 282 is provided with a pair of spaced-apart openings formed therein which are adapted to receive the bolt 290 extending therethrough to enable the dog 278 to be either maintained in the operative position or in the inoperative position. Likewise, brackets 292 and 294 are secured to support 268 and extend outwardly therefrom and are provided with openings formed therein adapted to receive bolt 296 extending therethrough. Rod 284 is provided with a pair of vertically spaced openings formed therein adapted to receive the bolt 296 to enable the dog 280 to be maintained in either the operative position or the inoperative position. The modified form of the lug assembly illustrated in FIGS. 11 and 12 would also be normally provided on the opposite end of trojan bar 116.

FIG. 13 illustrates a modified form of the ratchet arm assembly referred to generally by the reference numeral 298. The only difference in assembly 298 and that previously described is that the ratchet arm spring shaft 300 (corresponding to shaft 248) has been extended and is provided with a pair of spaced-apart openings 302 and 304 (not shown) provided at its upper end which are adapted to receive a bolt 306 extending therethrough to vary the position of shaft 300 relative to brace 308 which causes the pivotal movement of the ratchet arm assembly in either the reverse or forward modes.

The operation of the apparatus of FIGS. 1–14 is as follows. Water is supplied through the pipe 12 to the various sprinkler heads provided thereon and compressed air is furnished to the tank 142 from the compressor 140. The air is piped to the tank 142 thence through the cooling apparatus 148 and thence into the moisture trap or filter 152. The air is supplied to the T-connection referred to generally by the reference numeral 160. The T-connection 160 would be provided at the number one tower, that is, the tower closest to the central pivot point, to permit the compressed air to pass through the line 158 to the control means on the number one tower and to pass through the line 156' to the other drive towers in the system. As previously stated, an alignment panel 68 is provided on each of the towers (except the lead or outer tower) for maintaining proper alignment of the individual drive units. Ordinarily, air under pressure is always supplied to the drive means on the lead tower when the system is operating so that the lead tower is constantly being propelled.

At the inboard end (closest to the pivot point) of each truss section, mounted adjacent to the drive unit, is the flexible or universal-joint 46 which is part of the water pipe. The purpose of the flexible joint 46 is to allow angular reflection of the water line both in a horizontal and vertical plane so that the sprinkler system may operate on rough and uneven terrain. The alignment arm 64 is attached to the gimble ring 62 so as to control the position of each drive unit in relation to the other drive units.

Alignment valve 90 is normally closed but is opened by the alignment cam 70 as soon as the tower becomes out of engagement with the adjacent tower. When valve 90 is opened, air would pass through the alignment valve 90 so as to be supplied to the valve 120 as previously described. Air is also constantly being supplied to the valve 106 through the line 178. System pressure is supplied to the four-way valve 106 which is situated within the drive unit so as to be controlled by the two brackets 112 and 114 which are mounted on the trojan bar 116 in such a way that when the cylinder 132 reaches its fully extended position, the plunger 110 will be engaged by the bracket 114 so that the valve 106 will be shifted which in turn allows the system pressure to shift the four-way valve 120 causing the cylinder 132 to return to the retracted position at which time the opposite bracket 112 engages the plunger 108 which causes the four-way valve 106 to be shifted to its original position, thereby allowing system pressure to shift the four-way valve 120 to its original position thereby pressurizing the cylinder 132 causing the cylinder rod 134 to be extended at which time the bracket 114 again shifts the four-way valve 106 and a new cycle is commenced.

Assuming that the dog assemblies are in their forward mode positions (FIG. 4) longitudinal movement of the trojan bar 116 causes the dogs 214 and 214' to engage the driving lugs 24 and 26 respectively on the wheels so that the drive wheels are rotated a predetermined increment for each stroke or cycle of the trojan bar. As soon as the described tower moves back into alignment, valve 120 is moved to its closed position since air is no longer being supplied thereto by the line 94 thereby preventing system pressure from further operating the cylinder 132. Whenever a drive tower or unit again falls behind its proper position in relation to the other drive units, the alignment arm 64 moves the alignment rod 66 in such a manner so as to rotate the alignment cam 70 in a clockwise direction. The rotation of the alignment cam 70 in a clockwise direction results in an opening of the alignment valve 90. As soon as alignment valve 90 opens, system pressure is allowed to flow to the four-way valve 120 as previously described so that hydraulic cylinder 132 is activated to cause the drive tower to be propelled into alignment with the other drive towers. If a drive unit fails to move into proper alignment, the alignment cam 70 is further rotated clockwise so that the safety valve 100 is opened thereby allowing the system pressure to be exhausted to the atmosphere which causes the power unit 138 to be de-activated through the pressure shut-off switch 146 which senses the drop in the pressure in the surge tank 142. If a drive unit should roll ahead so as to be excessively out of alignment with the other drive units, the alignment arm 64 on the flexible joint 46 moves the alignment rod 66 with the help of the alignment spring 86 so as to cause the alignment cam 70 to be rotated in a counter-clockwise direction, thereby maintaining a closed position of the alignment valve 90 and opening the safety valve 100 so that the system pressure is exhausted to the atmosphere which results in the power unit 138 being de-activated through the pressure shut-off switch 146.

As previously stated, the cylinders 216, 224, 216' and 224' as well as the cylinders 262 and 262' are controlled by the three-way valve 166 located at the pivot point which is actuated by forward and reverse stops. At the end of the forward travel of the system, the forward stop shifts the three-way valve 166 thereby pressurizing air lines 170 and 172. This in turn shifts the pilot-operated spring loaded valve 174 so as to pressurize air line 180 and exhaust air line 182. Pressurizing air line 180 extends cylinder rods 22, 222' and 260' and retracts cylinder rods 230, 230' and 260. This places the reversing components in a reverse travel mode. In other words, dogs 212 and 212' are rotated downwardly into driving engagement with the lugs 24 and 26 on the wheels 20 and 22 with the dogs 214 and 214' being moved upwardly out of driving engagement with the lugs on the wheels 20 and 22. When the pilot operated valve 174 is shifted as described, it allows the air to pass through the reverse alignment valve 90'. In the reverse mode, the drive units maintain proper alignment through the alignment cam 196.

At the end of the reverse travel of the system, the reverse stop shifts the three-way valve 166 exhausting the air from lines 170 and 172. This allows the pilot operated valve 174 to return to its normal position. When valve 174 returns to its normal position, it exhausts the air from air line 180 and pressurizes air line 182. Pressurizing air line 182 retracts cylinder rods 222, 222' and 260' and extends cylinder rods 230, 230' and 260 to place the reversing components in the forward travel mode. In other words, dogs 214 and 214' are rotated downwardly into driving engagement with the lugs on the wheels 20 and 22 while the dogs 212 and 212' are rotated upwardly into an inoperative position. When the system is in the forward mode, the wheels 20 and 22 are rotated by the extending stroke of the power cylinder 132. When the system is in the reverse mode, the wheels are rotated by the retraction stroke of the power cylinder 132. The check valves 186 and 192 are installed in the inlet ports of alignment valves 90 and 90' to prevent system pressure from flowing reversely through either of the valves 90 and 90' and being exhausted through valve 174. If the manual dog assembly of FIGS. 11 and 12 is employed, the dogs would be manually pivoted as required.

The double or reversing ratchet arm assembly 232 is attached to the tower so as to pivot on the shaft 234. The reversible ratchet arm assembly is designed so as to prevent the wheel 20 from rolling in a direction opposite from the desired direction of travel. The proper position of the ratchet arm assembly 232 relative to forward or reverse travel is secured manually as described or automatically by the cylinders 262 and 262'. The ratchet springs 250 and 252 are engaged by the bracket 244 as previously described. Springs 250 and 252 are so positioned in relation to the assembly so as to firmly engage the ratchet arms against the wheel lugs 24 to prevent the wheel from rolling in a direction opposite from the desired direction of travel. The springs 250 and 252, when compressed, allow the wheel lugs 24 to pass by the ratchet arms 240 or 242 in the proper direction of travel.

FIGS. 15–21 illustrate a modified form of the double dog or means for reversing the direction of the towers. Inasmuch as substantially all of the structure of FIGS. 15–21 is substantially identical to the structure illustrated in FIGS. 1–10, only that portion of the structure that is different will be described with like reference numerals being used where appropriate.

The numerals 312 and 312' refer to double trojan bar lug or dog assemblies which are mounted on the opposite ends of trojan bar 116. Inasmuch as assemblies 312 and 312' are identical, only assembly 312 will be described in detail with "'" indicating identical structure on assembly 312'.

Figure 15:
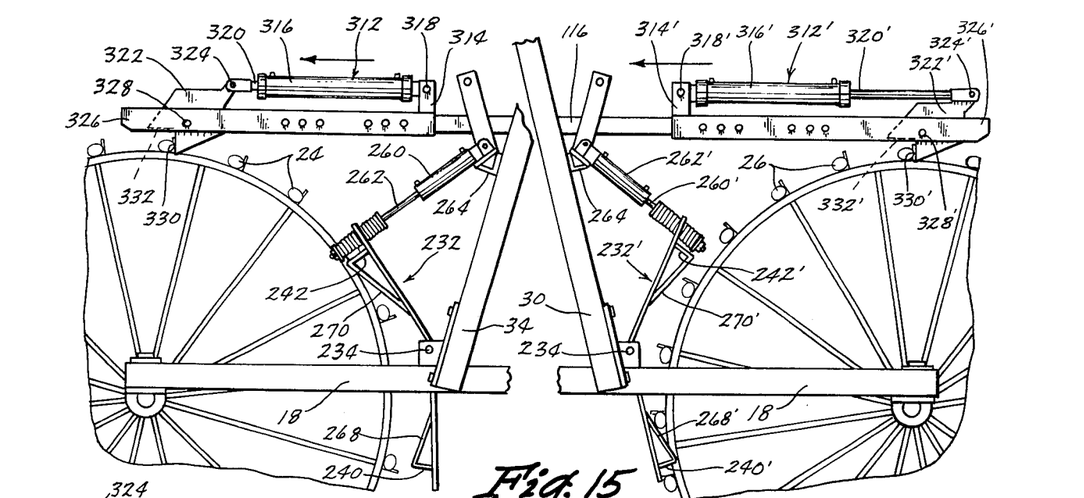
FIG. 15 is a side view of a modified form of the double dog.
Figure 16:
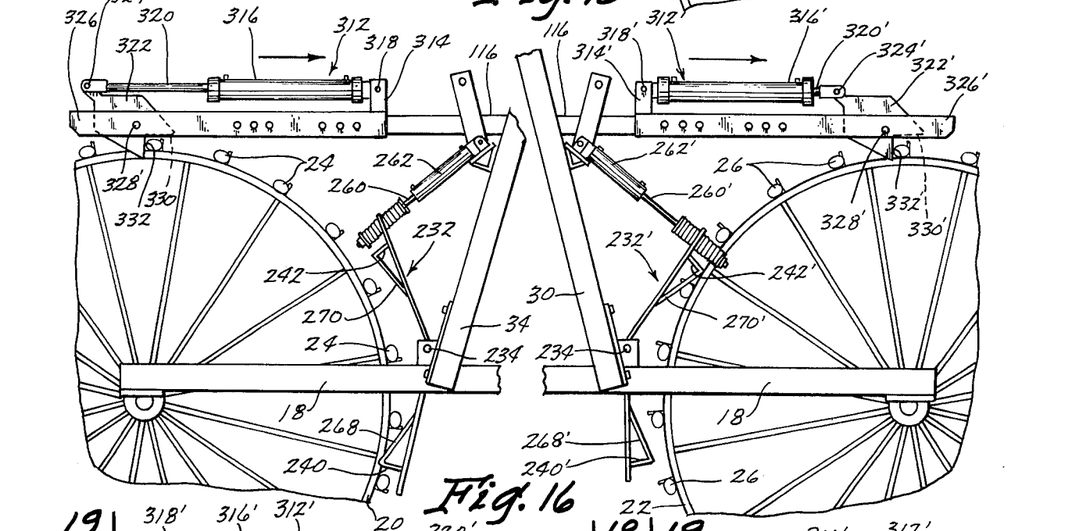
FIG. 16 is a side view of the modified form of the double dog of FIG. 15 illustrating the double dog in a reverse mode position.
Figures 17, 18, 19:
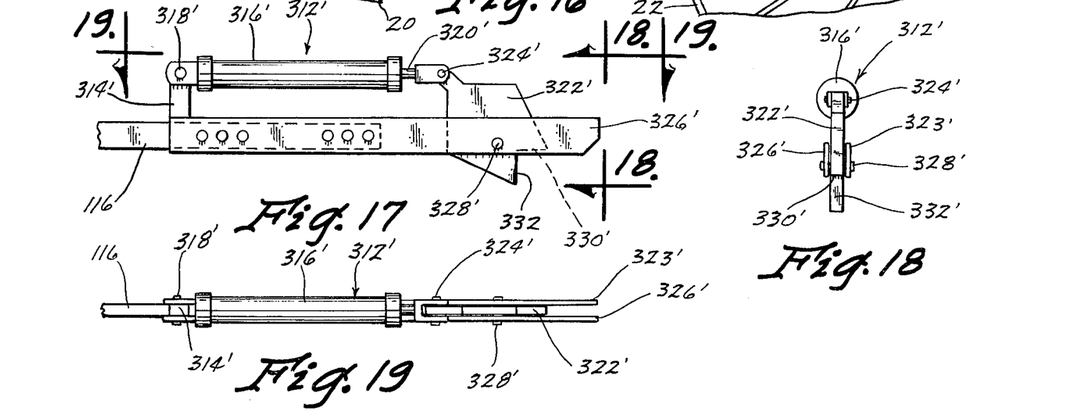
FIG. 17 is a partial side elevational view of the device of FIGS. 15 and 16 in the reverse mode.
FIG. 18 is a view seen on lines 18—18 of FIG. 17.
FIG. 19 is a view seen on lines 19—19 of FIG. 17.
Figure 20:
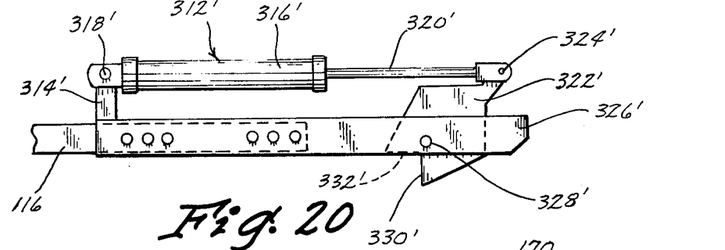
FIG. 20 is a view similar to FIG. 17 except that the double dog is in a forward mode.
Figure 21:
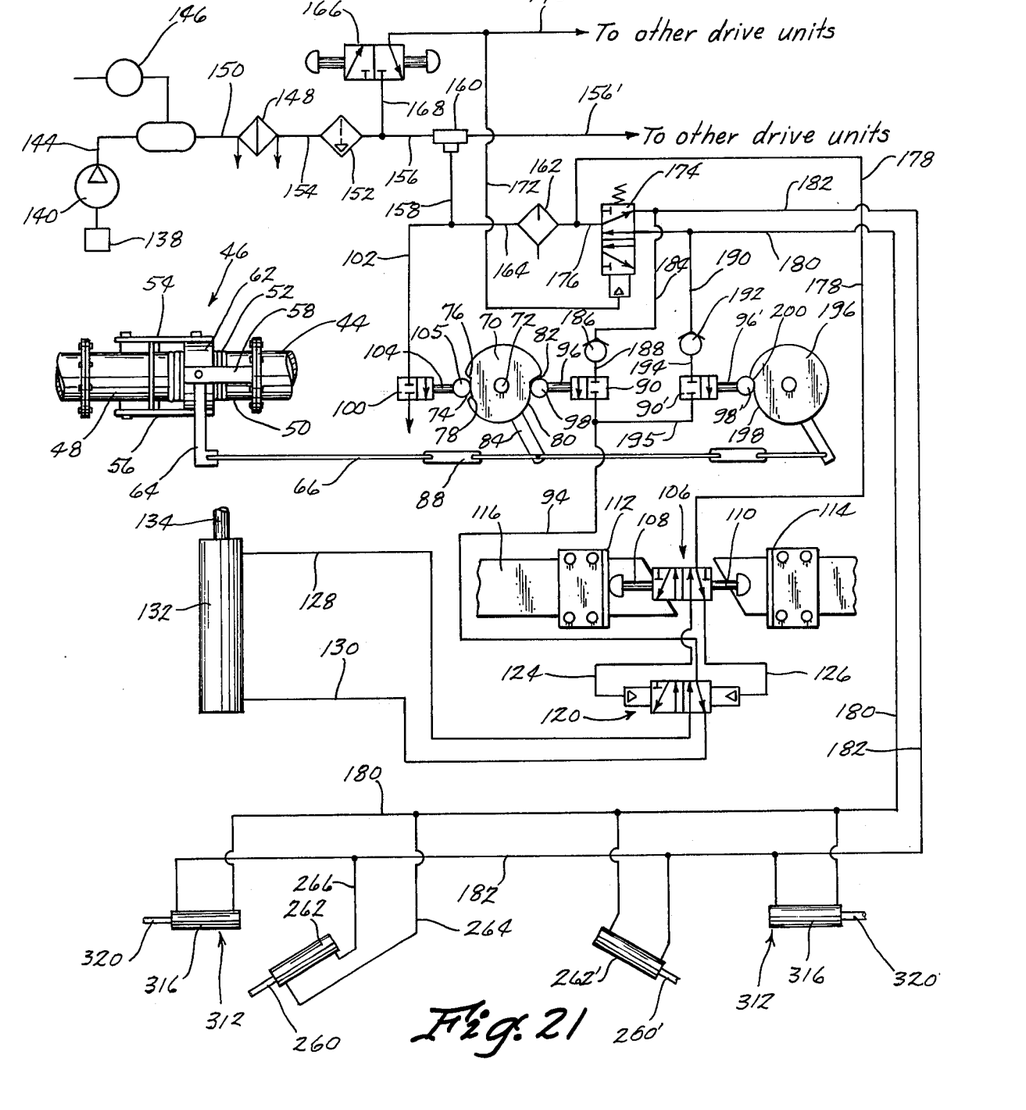
FIG. 21 is a partial schematic illustrating the circuitry for the modified form of the double dog of FIGS. 15-20.

Ear or bar 314 is secured to trojan bar 116 and extends upwardly therefrom as illustrated in FIGS. 15 and 19. As seen in the drawings, one end of a power cylinder 316 is pivotally connected to the upper end of bar 314 at 318. Cylinder 316 includes a rod 320 extending therefrom which is pivotally connected to a double dog 322 at 324. Double dog 322 is pivotally secured to spaced apart trojan bar portions 324 and 326 by a pin or bolt 328 as seen in FIGS. 17 and 19. Double dog 322 includes opposing dog surfaces 330 and 332. As seen in FIG. 17, the trojan bar portions 324 and 326 are secured to the outer end of trojan bar 116 by bolts or the like. As seen in FIG. 16, when rod 320 is withdrawn into the double acting cylinder 316, dog surface 332 engages one side of one of the lugs 26 so that reciprocation of the trojan bar 116 to the right as viewed in FIG. 16 will cause the wheel 22 to be rotated in a clockwise direction. While FIGS. 15–20 show a means for automatically positioning the dogs 322 and 322', it should be understood that the dogs 322 and 322' could have a pair of spaced-apart holes formed therein to facilitate the manual insertion of bolts through the trojan bar portions and the dog to maintain the dogs in their desired position.

As stated, FIG. 15 illustrates the reversible trojan bar lug assembly in a forward mode while FIG. 16 illustrates the assembly in a reverse mode. As can readily be seen in FIGS. 15 and 16, the forward or reverse travel of the drive unit is determined by the relative position of the dogs 322 and 322' as controlled by the cylinders 316 and 316' respectively.

At the end of the forward travel of the system, the forward stop shifts the three-way valve 166 thereby pressurizing air lines 170 and 172. This in turn shifts pilot-operated spring loaded valve 174 so as to pressurize air line 180 and exhaust air line 182. Pressurizing air line 180 extends cylinders 316 and 262' and retracts cylinders 316' and 262. This places the reversing components in a reversed travel mode.

At the end of the reverse travel of the system, the reverse stop shifts the three-way valve 166 exhausting the air from lines 170 and 172. This allows the pilot operated valve 174 to return to its normal position. When valve 174 returns to its normal position, it exhausts the air from the air line 180 and pressurizes air line 182. Pressurizing air line 182 retracts cylinders 316 and 262' and extends cylinders 316' and 262. This places the reversing components in the forward travel mode.

Thus it can be seen that a novel reversible trojan bar lug or double dog assembly has been provided which permits the center pivot sprinkler system to travel in either forwardly or rearwardly directions. Thus is can be seen that the invention accomplishes at least all of its stated objectives.

I claim:

1. A reversible self-propelled center pivot sprinkler system comprising, a water supply pipe movable about a center pivot point, a plurality of spaced-apart, wheeled drive towers supporting said supply pipe above the area to be sprinkled, a drive means on each of said towers to propel said towers to move said towers and supply pipe about said center pivot point, each of said towers comprising a frame means having a pair of spaced-apart drive wheels rotatably mounted thereon, a trojan bar means reciprocatably mounted on said frame means and movable between first and second positions, at least one double dog means on said trojan bar means for engagement with at least one of said drive wheels for selectively driving said wheel forwardly at times and for selectively driving said wheel rearwardly at other times, a power means mounted on said frame means and being operatively connected to said trojan bar means to reciprocate said trojan bar means, and a control means for controlling the operation of said power means so that the associated tower is propelled at the desired rate relative to the other towers in the system, said double dog means comprising a plate means operatively pivotally mounted on said trojan bar means, said plate means having oppositely disposed dog surfaces formed therein, said plate means being selectively pivotally secured to said trojan bar means and being movable from a first position, wherein one of said dog surfaces will engage the lugs on said one wheel to drive said wheel and tower forwardly to a second position, wherein the other of said dog surfaces will engage the lugs on said one wheel to drive said wheel and tower rearwardly, and a power cylinder pivotally connected to said plate means for moving said plate means between its first and second positions.

2. The system of claim 1 wherein rearward and forward stops are provided on said center pivot, said control means including means operatively connected to said power cylinder and being responsive to said rearward and forward stops.

* * * * *